(12) United States Patent
Wang

(10) Patent No.: US 11,460,958 B2
(45) Date of Patent: Oct. 4, 2022

(54) TOUCH PANEL, TOUCH DISPLAY AND METHOD OF MANUFACTURING TOUCH PANEL

(71) Applicant: WUHAN CHINA STAR OPTOELECTRONICS SEMICONDUCTOR DISPLAY TECHNOLOGY CO., LTD., Hubei (CN)

(72) Inventor: Lei Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 486 days.

(21) Appl. No.: 16/483,902

(22) PCT Filed: May 15, 2019

(86) PCT No.: PCT/CN2019/086951
§ 371 (c)(1),
(2) Date: Aug. 6, 2019

(87) PCT Pub. No.: WO2020/215402
PCT Pub. Date: Oct. 29, 2020

(65) Prior Publication Data
US 2021/0365135 A1    Nov. 25, 2021

(30) Foreign Application Priority Data
Apr. 24, 2019  (CN) .......................... 201910334467.2

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04103* (2013.01)

(58) Field of Classification Search
CPC ...... G06F 3/0412; G06F 3/044; G06F 3/0445; G06F 2203/04103; G06F 3/0446; G06F 3/0447
See application file for complete search history.

(56) References Cited

U.S. PATENT DOCUMENTS

| 2015/0145824 A1* | 5/2015 | Park | G06F 3/0446 345/174 |
| 2015/0234486 A1* | 8/2015 | Huang | B23K 26/361 430/319 |

(Continued)

FOREIGN PATENT DOCUMENTS

| CN | 104050464 A | 9/2014 |
| CN | 107035451 A | 10/2017 |

(Continued)

*Primary Examiner* — Hong Zhou

(57) ABSTRACT

A touch panel, a touch display and a method of manufacturing the touch panel are provided. The touch panel includes a substrate, at least one driving electrode, at least one first sensing electrode, at least one second sensing electrode, and an elastic dielectric material. The at least one first sensing electrode is disposed on the substrate and is electrical insulating from the at least one driving electrode. The at least one second sensing electrode is disposed on the at least one first sensing electrode and overlapped with the at least one first sensing electrode. The elastic dielectric material is disposed between the at least one first sensing electrode and the at least one second sensing electrode.

10 Claims, 3 Drawing Sheets

(56) References Cited

U.S. PATENT DOCUMENTS

| | | | |
|---|---|---|---|
| 2017/0277341 A1* | 9/2017 | Lim | G06F 3/04166 |
| 2017/0308241 A1 | 10/2017 | Short et al. | |
| 2017/0329436 A1* | 11/2017 | Choi | G02F 1/133305 |
| 2018/0120615 A1* | 5/2018 | Wang | G06F 3/0446 |
| 2018/0121002 A1* | 5/2018 | Kim | H01L 51/5237 |
| 2018/0364851 A1 | 12/2018 | Yeh et al. | |
| 2019/0064972 A1 | 2/2019 | Ryu et al. | |
| 2019/0189699 A1 | 6/2019 | Ye | |
| 2019/0204955 A1* | 7/2019 | Haga | G06F 3/016 |
| 2019/0332210 A1* | 10/2019 | Lee | G06F 3/044 |
| 2021/0357078 A1* | 11/2021 | Yuan | G06F 3/0445 |

FOREIGN PATENT DOCUMENTS

| | | |
|---|---|---|
| CN | 108089748 A | 5/2018 |
| CN | 109144303 A | 1/2019 |

\* cited by examiner

TOUCH PANEL, TOUCH DISPLAY AND METHOD OF MANUFACTURING TOUCH PANEL

FIELD OF INVENTION

The present disclosure relates to touch technologies, and more particularly, to a touch panel, a touch display and a method of manufacturing the touch panel.

BACKGROUND OF INVENTION

In mobile devices, such as mobile phones, the latest technology is the screen fingerprint unlocking function. However, how to judge whether the user press on the screen to initiate fingerprint recognition and display the corresponding unlocking pattern is rarely mentioned. In addition, capacitive touch panels do not provide perceptual feedback for force of finger pressing.

Therefore, prior art has drawbacks and is in urgent need of improvement.

SUMMARY OF INVENTION

In view of the above, the present disclosure provides a touch panel, a touch display and a method of manufacturing the touch panel to solve aforementioned issues.

In order to achieve above-mentioned object of the present disclosure, one embodiment of the disclosure provides a touch panel including a substrate, at least one driving electrode, and at least one first sensing electrode. The at least one driving electrode is disposed on the substrate. The at least one first sensing electrode is disposed on the substrate and is electrical insulating from the at least one driving electrode. The touch panel further includes at least one second sensing electrode and an elastic dielectric material. The at least one second sensing electrode is disposed on the at least one first sensing electrode and overlapped with the at least one first sensing electrode. The elastic dielectric material is disposed between the at least one first sensing electrode and the at least one second sensing electrode.

In one embodiment of the touch panel, the elastic dielectric material covers the at least one driving electrode, the at least one first sensing electrode and the at least one second sensing electrode.

In one embodiment of the touch panel, a thickness of the at least one driving electrode is greater than a thickness of the at least one first sensing electrode.

In one embodiment of the touch panel, a thickness of the at least one driving electrode is greater than a thickness of the at least one second sensing electrode.

In one embodiment of the touch panel, the elastic dielectric material is a high dielectric constant elastic polymer material.

One embodiment of the disclosure further provides a touch display including a display panel, a control circuit, and a touch panel. The touch panel is disposed on the display panel. The control circuit electrically connects with the display panel and the touch panel. The touch panel includes a substrate, at least one driving electrode, and at least one first sensing electrode. The at least one driving electrode is disposed on the substrate. The at least one first sensing electrode is disposed on the substrate and is electrical insulating from the at least one driving electrode. The touch panel further includes at least one second sensing electrode and an elastic dielectric material. The at least one second sensing electrode is disposed on the at least one first sensing electrode and overlapped with the at least one first sensing electrode. The elastic dielectric material is disposed between the at least one first sensing electrode and the at least one second sensing electrode. The control circuit is configured to determine whether the touch panel is bent outward or bent inward by comparing a capacitance between the at least one driving electrode and the at least one first sensing electrode with a capacitance between the at least one driving electrode and the at least one second sensing electrode.

In one embodiment of the touch display, the elastic dielectric material covers the at least one driving electrode, the at least one first sensing electrode and the at least one second sensing electrode.

In one embodiment of the touch display, a thickness of the at least one driving electrode is greater than a thickness of the at least one first sensing electrode.

In one embodiment of the touch display, a thickness of the at least one driving electrode is greater than a thickness of the at least one second sensing electrode.

One embodiment of the disclosure further provides a method of manufacturing a touch panel including steps of:

forming at least one patterned driving electrode and at least one patterned first sensing electrode on a substrate;

etching the at least one first sensing electrode to reduce a thickness of the at least one first sensing electrode;

covering the at least one first sensing electrode by an elastic dielectric material and exposing the at least one driving electrode;

forming at least one patterned second sensing electrode on the at least one first sensing electrode, wherein the at least one second sensing electrode is overlapped with the at least one first sensing electrode; and covering the at least one second sensing electrode and the at least one driving electrode by the elastic dielectric material and planarizing a surface of the elastic dielectric material.

In comparison with the prior art, one embodiment of the disclosure provides the touch panel, that when a user is pressing the touch panel, the elastic dielectric material deforms accordingly, so that a distance between the at least one driving electrode and the at least one first sensing electrode and a distance between the at least one driving electrode and the at least one second sensing electrode is different, therefore a capacitance between the at least one driving electrode and the at least one first sensing electrode and a capacitance between the at least one driving electrode and the at least one second sensing electrode is different accordingly. So, the embodiment of the disclosure can effectively realize an effect of pressing recognition.

DETAILED DESCRIPTION OF PREFERRED EMBODIMENTS

The following description of the embodiments is provided by reference to the following drawings and illustrates the specific embodiments of the present disclosure. Directional terms mentioned in the present disclosure, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

Figure 1:
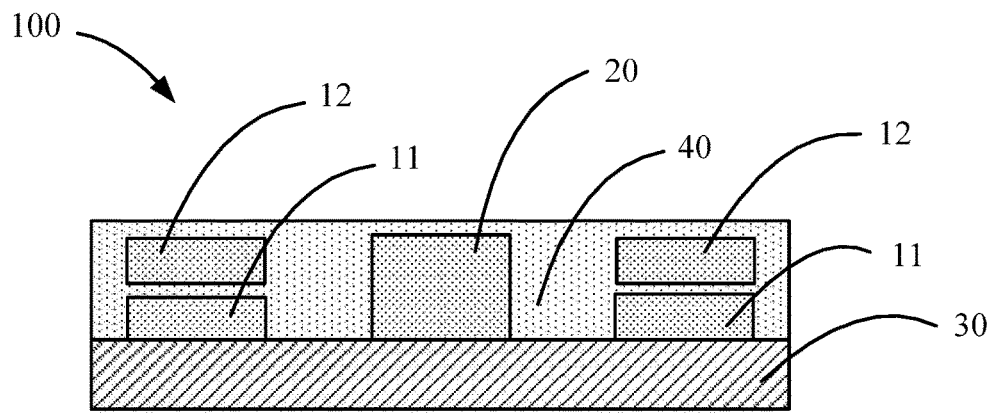
FIG. 1 is a schematic cross-section view of a structure of a touch panel according to an embodiment of the present disclosure.

Referring to FIG. 1, one embodiment of the disclosure provides a touch panel 100 including a substrate 30, at least one driving electrode 20, and at least one first sensing electrode 11. The at least one driving electrode 20 is disposed on the substrate 30. The at least one first sensing electrode 11 is disposed on the substrate 30 and is electrical insulating from the at least one driving electrode 20. The touch panel 100 further includes at least one second sensing electrode 12 and an elastic dielectric material 40. The at least one second sensing electrode 12 is disposed on the at least one first sensing electrode 11 and overlapped with the at least one first sensing electrode 11. The elastic dielectric material 40 is disposed between the at least one first sensing electrode 11 and the at least one second sensing electrode 12.

In detail, material of the at least one driving electrode 20, the at least one first sensing electrode 11, and the at least one second sensing electrode 12 includes indium tin oxide (ITO), or nickel gold film.

In one embodiment of the touch panel 100, the elastic dielectric material 40 covers the at least one driving electrode 20, the at least one first sensing electrode 11 and the at least one second sensing electrode 12.

In one embodiment of the touch panel 100, a thickness of the at least one driving electrode 20 is greater than a thickness of the at least one first sensing electrode 11.

In one embodiment of the touch panel 100, a thickness of the at least one driving electrode 20 is greater than a thickness of the at least one second sensing electrode 12.

In one embodiment of the touch panel 100, the elastic dielectric material 40 is a high dielectric constant elastic polymer material.

Figure 4:
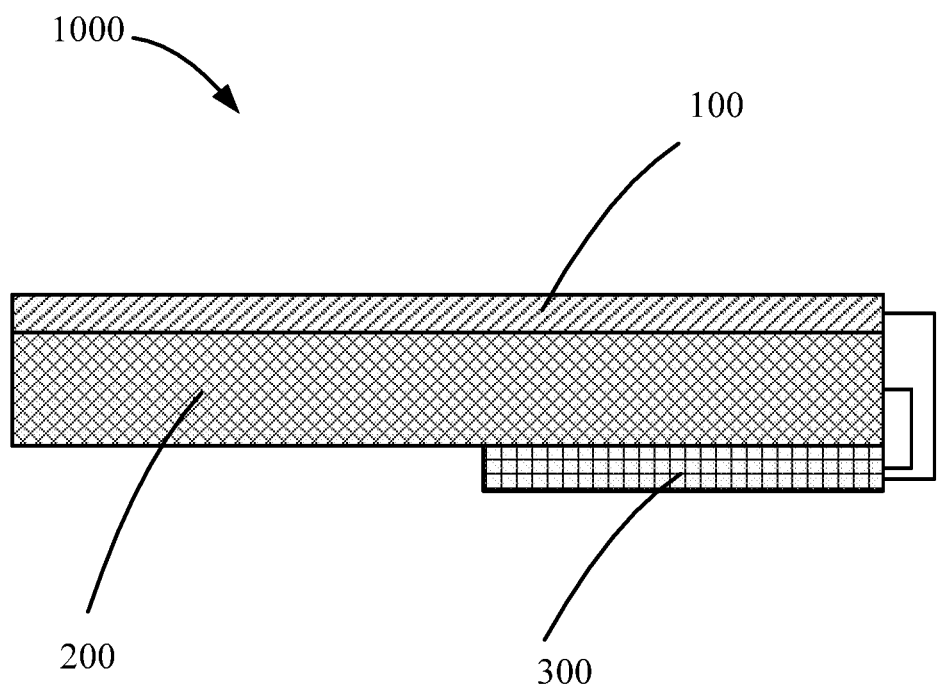
FIG. 4 is a schematic cross-section view of a structure of a touch display according to an embodiment of the present disclosure.

Referring to FIGS. 4 and 1, one embodiment of the disclosure further provides a touch display 1000 including a display panel 200, a control circuit 300, and a touch panel 100. The touch panel 100 is disposed on the display panel 200. The control circuit 300 electrically connects with the display panel 200 and the touch panel 100. The touch panel 100 includes a substrate 30, at least one driving electrode 20, and at least one first sensing electrode 11. The at least one driving electrode 20 is disposed on the substrate 30. The at least one first sensing electrode 11 is disposed on the substrate 30 and is electrical insulating from the at least one driving electrode 20. The touch panel 100 further includes at least one second sensing electrode 12 and an elastic dielectric material 40. The at least one second sensing electrode 12 is disposed on the at least one first sensing electrode 11 and overlapped with the at least one first sensing electrode 11. The elastic dielectric material 40 is disposed between the at least one first sensing electrode 11 and the at least one second sensing electrode 12. The control circuit 300 is configured to determine whether the touch panel 100 is bent outward or bent inward by comparing a capacitance between the at least one driving electrode 20 and the at least one first sensing electrode 11 with a capacitance between the at least one driving electrode 20 and the at least one second sensing electrode 12.

In detail, when the touch panel 100 is bent inward, the elastic dielectric material deforms accordingly, so that a distance between the at least one first sensing electrode 11 and the at least one driving electrode 20 is greater than a distance between the at least one second sensing electrode 12 and the at least one driving electrode 20, therefore a capacitance between the at least one first sensing electrode 11 and the at least one driving electrode 20 is less than a capacitance between the at least one second sensing electrode 12 and the at least one driving electrode 20. So, it can determine whether the touch panel 100 is bent inward by a difference of the capacitance.

Similarly, when the touch panel 100 is bent outward, the elastic dielectric material deforms accordingly, so that a distance between the at least one first sensing electrode 11 and the at least one driving electrode 20 is less than a distance between the at least one second sensing electrode 12 and the at least one driving electrode 20, therefore a capacitance between the at least one first sensing electrode 11 and the at least one driving electrode 20 is greater than a capacitance between the at least one second sensing electrode 12 and the at least one driving electrode 20. So, it can determine whether the touch panel 100 is bent inward by a difference of the capacitance.

In detail, degrees of change in capacitance vary with degrees of bent inward, therefore degrees of bent inward can be determined by change of capacitance.

In detail, material of the at least one driving electrode 20, the at least one first sensing electrode 11, and the at least one second sensing electrode 12 includes indium tin oxide (ITO), or nickel gold film.

In one embodiment of the touch display 1000, the elastic dielectric material 40 covers the at least one driving electrode 20, the at least one first sensing electrode 11 and the at least one second sensing electrode 12.

In one embodiment of the touch display 1000, a thickness of the at least one driving electrode 20 is greater than a thickness of the at least one first sensing electrode 11.

In one embodiment of the touch display 1000, a thickness of the at least one driving electrode 20 is greater than a thickness of the at least one second sensing electrode 12.

Figure 2:
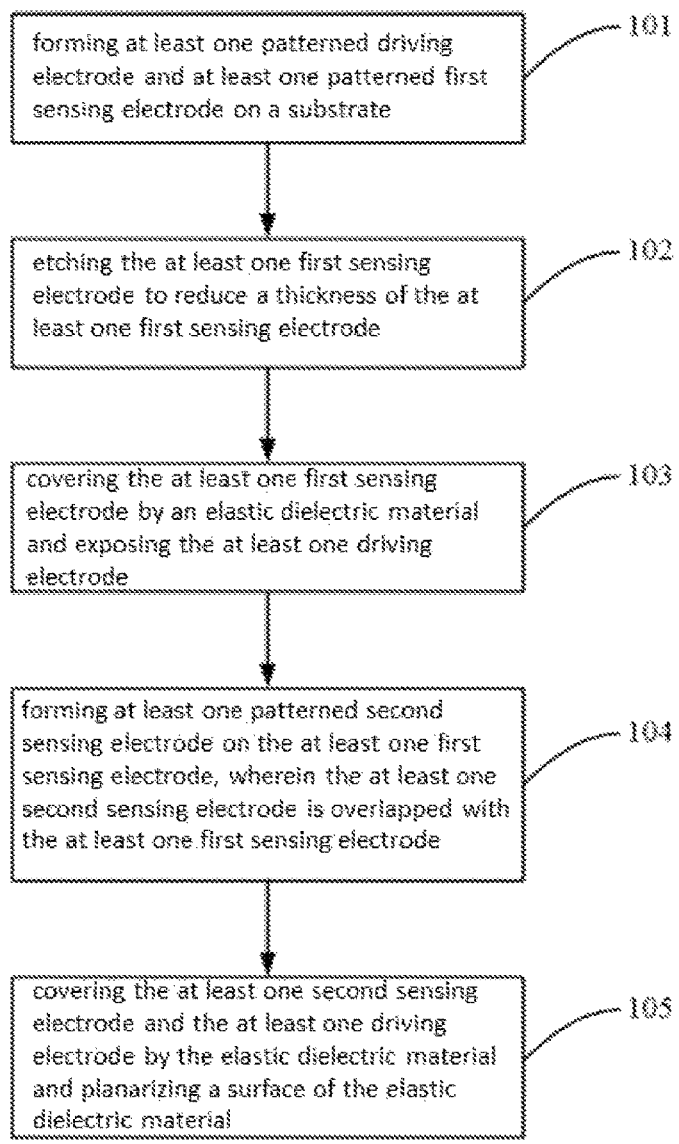
FIG. 2 is a schematic flowchart of a method of manufacturing the touch panel according to an embodiment of the present disclosure.
Figure 3:
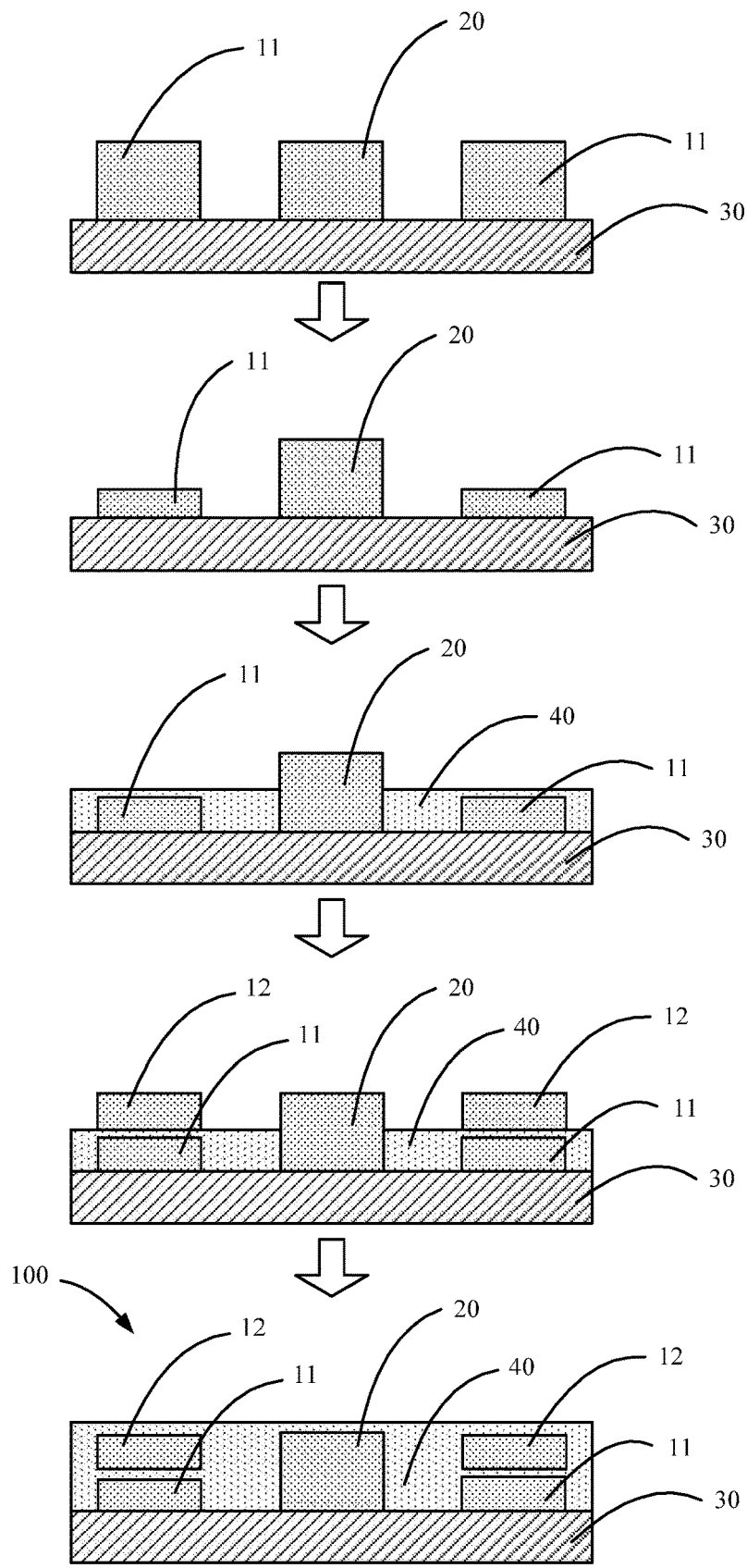
FIG. 3 is a schematic view of a method of manufacturing the touch panel according to an embodiment of the present disclosure.

Referring to FIGS. 2 and 3, one embodiment of the disclosure further provides a method of manufacturing a touch panel including steps of:

At block 101: forming at least one patterned driving electrode 20 and at least one patterned first sensing electrode 11 on a substrate 30;

At block 102: etching the at least one first sensing electrode 11 to reduce a thickness of the at least one first sensing electrode 11;

At block 103: covering the at least one first sensing electrode 11 by an elastic dielectric material 40 and exposing the at least one driving electrode 20;

At block 104: forming at least one patterned second sensing electrode 12 on the at least one first sensing electrode 11, wherein the at least one second sensing electrode 12 is overlapped with the at least one first sensing electrode 11; and At block 105: covering the at least one second sensing electrode 12 and the at least one driving electrode 20 by the elastic dielectric material 40 and planarizing a surface of the elastic dielectric material 40.

In detail, material of the at least one driving electrode 20, the at least one first sensing electrode 11, and the at least one second sensing electrode 12 includes indium tin oxide (ITO), or nickel gold film.

In comparison with the prior art, one embodiment of the disclosure provides the touch panel, that when a user is pressing the touch panel, the elastic dielectric material deforms accordingly, so that a distance between the at least one driving electrode and the at least one first sensing electrode and a distance between the at least one driving electrode and the at least one second sensing electrode is different, therefore a capacitance between the at least one driving electrode and the at least one first sensing electrode and a capacitance between the at least one driving electrode and the at least one second sensing electrode is different accordingly. So, the embodiment of the disclosure can effectively realize an effect of pressing recognition.

The present disclosure has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A touch panel, comprising:
   a substrate;
   at least one driving electrode;
   at least one first sensing electrode, wherein the at least one driving electrode is disposed on the substrate, the at least one first sensing electrode is disposed on the substrate beside the at least one driving electrode and is electrical insulating from the at least one driving electrode;
   at least one second sensing electrode disposed on the at least one first sensing electrode and overlapped with the at least one first sensing electrode; and
   an elastic dielectric material disposed between the at least one first sensing electrode and the at least one second sensing electrode and covering the at least one driving electrode, the at least one first sensing electrode, and the at least one second sensing electrode, wherein the at least one driving electrode is not laminated with or overlapped with the at least one first sensing electrode or the at least one second sensing electrode, and a thickness of the at least one driving electrode is greater than a thickness of the at least one first sensing electrode.

2. The touch panel according to claim 1, wherein a thickness of the at least one driving electrode is greater than a thickness of the at least one second sensing electrode.

3. The touch panel according to claim 2, wherein the elastic dielectric material is a high dielectric constant elastic polymer material.

4. A touch display, comprising:
   a display panel;
   a control circuit; and
   a touch panel, wherein the touch panel is disposed on the display panel, the control circuit electrically connects with the display panel and the touch panel, wherein the touch panel comprises:
   a substrate;
   at least one driving electrode;
   at least one first sensing electrode, wherein the at least one driving electrode is disposed on the substrate, the at least one first sensing electrode is disposed on the substrate beside the at least one driving electrode and is electrical insulating from the at least one driving electrode;
   at least one second sensing electrode disposed on the at least one first sensing electrode and overlapped with the at least one first sensing electrode; and
   an elastic dielectric material disposed between the at least one first sensing electrode and the at least one second sensing electrode and covering the at least one driving electrode, the at least one first sensing electrode, and the at least one second sensing electrode, wherein the at least one driving electrode is not laminated with or overlapped with the at least one first sensing electrode or the at least one second sensing electrode, and a thickness of the at least one driving electrode is greater than a thickness of the at least one first sensing electrode.

5. The touch display according to claim 4, wherein the control circuit is configured to determine whether the touch panel is bent outward or bent inward by comparing a capacitance between the at least one driving electrode and the at least one first sensing electrode with a capacitance between the at least one driving electrode and the at least one second sensing electrode.

6. The touch display according to claim 5, wherein a thickness of the at least one driving electrode is greater than a thickness of the at least one second sensing electrode.

7. The touch display according to claim 6, wherein the elastic dielectric material is a high dielectric constant elastic polymer material.

8. A method of manufacturing a touch panel, comprising steps of:
   forming at least one patterned driving electrode and at least one patterned first sensing electrode beside the at least one driving electrode on a substrate;
   etching the at least one first sensing electrode to reduce a thickness of the at least one first sensing electrode;
   covering the at least one first sensing electrode by an elastic dielectric material and exposing the at least one driving electrode;
   forming at least one patterned second sensing electrode on the at least one first sensing electrode, wherein the at least one second sensing electrode is overlapped with the at least one first sensing electrode, and the at least one driving electrode is not laminated with or overlapped with the at least one first sensing electrode or the at least one second sensing electrode; and
   covering the at least one second sensing electrode and the at least one driving electrode by the elastic dielectric material and planarizing a surface of the elastic dielectric material, wherein a thickness of the at least one driving electrode is greater than a thickness of the at least one first sensing electrode.

9. The method of manufacturing the touch panel according to claim 8, wherein a thickness of the at least one driving electrode is greater than a thickness of the at least one second sensing electrode.

10. The method of manufacturing the touch panel according to claim 9, wherein the elastic dielectric material is a high dielectric constant elastic polymer material.

* * * * *